Sept. 1, 1970  A. W. WAINIO  3,526,802
COMPACT HIGH-OUTPUT FLUORESCENT LAMP WITH AMALGAM TYPE
MERCURY-VAPOR PRESSURE CONTROL MEANS
AND A NEON-ARGON FILL GAS
Filed Jan. 26, 1968
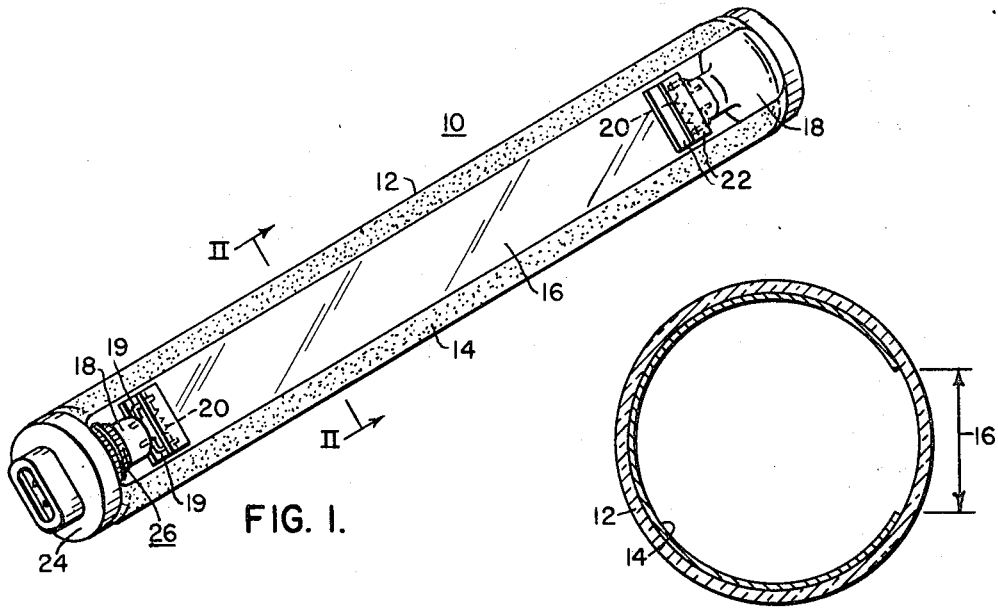
INVENTOR
Albert W. Wainio
BY
D. S. Buley
AGENT

United States Patent Office 3,526,802
Patented Sept. 1, 1970

3,526,802
COMPACT HIGH-OUTPUT FLUORESCENT LAMP WITH AMALGAM TYPE MERCURY-VAPOR PRESSURE CONTROL MEANS AND A NEON-ARGON FILL GAS
Albert W. Wainio, Livingston, N.J., assignor to Westinghouse Electric Corporation, Pittsburgh, Pa., a corporation of Pennsylvania
Filed Jan. 26, 1968, Ser. No. 700,911
Int. Cl. H01j 19/70
U.S. Cl. 313—109
6 Claims

ABSTRACT OF THE DISCLOSURE

The light output and power loading capability of a compact fluorescent lamp, such as an 18 inch "T8" aperture lamp adapted for use in photocopying apparatus, are increased by placing an indium-mercury amalgam that contains from 80 atom percent to 95 atom percent indium on the stem at a distance of from 20 to 40 mm. from the cathode and utilizing a fill gas consisting of a mixture of neon and argon at a total pressure of from 2.5 to 4 mm. of mercury. The fill gas composition and pressure are correlated with the cathode-amalgam spacing and the amalgam composition to provide an 18 inch T8 fluorescent lamp that reaches peak light output at loadings in excess of 20 watts per foot without forced cooling and which can be operated at loadings up to 50 watts per foot with forced cooling.

BACKGROUND OF THE INVENTION

This invention relates to electric discharge lamps and has particular reference to a compact high-output fluorescent lamp adapted for use in photocopying machines.

So-called "high output" fluorescent lamps are well known in the art and are widely used in the lighting industry since they greatly increase the brightness levels which can be achieved with a lamp of a given size. However, as the power loading of a fluorescent lamp is increased its operating temperature also increases. This raises the mercury vapor pressure and, when it becomes excessive, the light output of the lamp decreases rather than increases.

The problem is much more acute in the case of compact or small size fluorescent lamps such as 18 inch "T8" lamps. Conventional lamps of this size are nominally rated at 15 watts (total) and thus operate at a loading of approximately 10 watts per foot. However, the light output at this lower loading is too low to meet the requirements of the photocopying industry, for example, where an intense uniform source of light is needed to properly sensitize the paper with an image of the material being copied. The problem is aggravated by the fact that the lamp compartments of such photocopying machines are confined and generally include a reflector—both of which increases the operating temperature of the lamp and cause it to overheat. In order to minimize the drop in light output under these conditions and permit T8 lamps to be used in such machines, it has heretofore been necessary to force cool the lamp with a blower or other means.

The use of an amalgam such as an alloy of indium and mercury to control the operating mercury-vapor pressure within a fluorescent lamp is known and is disclosed in U.S. Pat. No. 3,007,071 to Lompe et al. However, placing such an amalgam on the bulb wall in accordance with the teachings of the aforesaid Lompe et al. patent has failed to solve the problem insofar as the amalgam is too close to the discharge and operates at such a high temperature in highly-loaded compact fluorescent lamps, such as the above-mentioned T8 lamps, that the mercury vapor pressure is still excessive.

SUMMARY OF THE INVENTION

It is accordingly the general object of the present invention to provide a compact fluorescent lamp that can be operated at loadings in excess of 10 watts per foot and at high operating temperatures without impairing its light output.

Another and more specific object is the provision of a compact high-output aperture type fluorescent lamp which can be readily manufactured on a mass production basis and which will operate efficiently without the need for forced cooling in confined spaces such as those encountered in photocopying machines.

The aforesaid objects and other advantages are achieved in accordance with the present invention by placing a suitable amalgam on the lamp stem at a predetermined distance from the cathode and utilizing a mixed fill gas of neon and argon that contains from 75% to 90% neon at fill pressures of from 2.5 to 4.0 mm. of mercury. The physical location and composition of the amalgam are so correlated with respect to the fill gas composition and fill pressure that an 18 inch T8 aperture fluorescent lamp will operate efficiently at power loadings in excess of 20 watts per foot, without cooling and up to 50 watts per foot, with cooling, under the adverse temperature and space conditions encountered in photocopying machines or similar environments. In accordance with a preferred embodiment, the amalgam consists of an indium-mercury alloy that contains from 80 atom percent to 95 atom percent indium and the amalgam is fastened to the stem at a distance of from 20 mm. to 40 mm. from the nearest cathode.

BRIEF DESCRIPTION OF THE DRAWING

A better understanding of the invention will be obtained by referring to the accompanying drawing, wherein:

FIG. 1 is a perspective view of an 18 inch T8 high-output aperture fluorescent lamp which embodies the invention;

FIG. 2 is an enlarged cross-sectional view through the lamp along the line II—II of FIG. 1;

FIG. 3 is an enlarged side elevational view, partly in section, of the end of the lamp which contains the mercury-vapor pressure regulating component; and FIG. 4 is a graph comparing the output vs. time characteristics of the improved lamps with that of a conventional lamp of the same size.

DESCRIPTION OF THE PREFERRED EMBODIMENT

While the present invention can be used with advantage in various types of compact fluorescent lamps such as Circline lamps or the like, it is especially adapted for use in highly loaded aperture lamps of the fluorescent type utilized in photocopying machines and has accordingly been so illustrated and will be so described.

In FIGS. 1 to 3 there is shown such as aperture fluorescent lamp 10 which consists of a tubular glass envelope 12 that is provided with a partial internal coating 14 of ultra-violet-responsive phosphor that extends around only a portion of the envelope circumference and thus leaves a slit window or aperture 16 of clear glass that extends along the entire length of the envelope. The ends of the envelope 12 are hermetically sealed to glass stems 18 which are provided with the usual pair of lead-in wires 19 and electrodes 20 which are coated with electron-emissive material and serves as cathodes. The lead-in wires 19 are electrically connected to suitable contacts carried by base members 24 that are attached to the sealed ends of the envelope 12 in accordance with standard lamp-making practice. A pair of enlarged metal anodes 22 are fastened to the respective lead-in wires and are supported on either side of the associated cathode 20 in the usual fashion.

The envelope 12 has a diameter of 1 inch (T8) and the lamp 10 has an overall length of 18 inches. The bulb diameter can vary from 0.75 to 1.25 inches (T6 and T10 bulbs, respectively) and the lamp length from 1 to 2 feet.

In accordance with the present invention, the light output and power loading capability of the compact lamp 10 are enhanced by utilizing an amalgam of preselected composition to control the mercury vapor pressure during operation in conjunction with a mixed fill gas that contains controlled amounts of neon and argon and has a fill pressure which permits the lamp to operate efficiently at power loadings in excess of 20 watts per foot. Preferably, the amalgam consists of an alloy of indium and mercury which contains from 80 atom percent to 95 atom percent indium and is located on one of the lamp stems 18 at a distance (dimension $x$ in FIG. 3) of from 20 mm. to 40 mm. in back of the proximate cathode 20. The fill gas consists of a mixture of neon and argon that contains from 75% to 90% neon and the total fill gas pressure is maintained between 2.5 and 4.0 mm. of mercury. A fill gas of 80% neon-20% argon and a fill pressure of approximately 3 mm. of mercury are preferred.

As shown in FIGS. 1 and 3, the indium-mercury amalgam is retained in the aforesaid spaced location with respect to the cathode 20 by means of a collar-like foraminous holder 26 that is anchored in encircling relationship on one of the glass stems 18 by a wire locking ring 28. The holder 26 is fabricated from superimposed strips of wire mesh and the amalgamating metal is sandwiched between these strips. A mesh-amalgam collar assembly of this type and the manner of manufacturing it are described in detail in copending application Ser. No. 381,503 of George S. Evans filed July 9, 1964 and assigned to the assignee of the present invention.

The marked improvement in the light output of an 18 inch T8 aperture fluorescent lamp of the type illustrated in FIGS. 1 to 3 is depicted in the graphs shown in FIG. 4. As indicated by curve 30, the light output of an identical prior art lamp containing a straight argon fill at a pressure of 2.5 mm. of mercury and a condensed mercury pool, which controlled the vapor pressure in the conventional manner, increased slightly within one minute after the lamp was energized and operated at 0.8 amp and 25 watts (total). The light output then decreased gradually and finally stabilized at a slightly lower value within about 7 minutes, even though the lamp was continuously cooled by an air blower of the type used in photocopying machines.

In contrast, the light output (curve 32) of a lamp of the same type and size but containing a neon-argon fill gas and an In-Hg amalgam in accordance with the invention stabilized at a much higher value without any forced cooling. The lamp contained an amalgam of 81 atom percent In and 19 atom percent Hg (170 mg. In and 70 mg. Hg) located 20 mm. from the cathode and was operated at 0.8 amp and 33 watts total (22 watts per foot). As shown by curve 32, the light output was initially lower than the stabilized output of the conventional lamp but rapidly increased and eventually stabilized at a value which was over 60% higher than that of the conventional lamp. The improved lamp contained 80% neon-20% argon at 3 mm. of mercury pressure. Hence, the invention provides a compact fluorescent lamp which will operate at high power loadings and produce more light without any forced cooling whatsoever in comparison to a continuously force-cooled conventional lamp operated at the same current.

Tests have shown that if the cathode-amalgam spacing is increased from 20 mm. to 27 mm. by extending the length of the lead wires, the improved lamp will reach peak output at 1.2 amps (50 watts total and 33 watts per foot) when operated at an ambient temperature of about 77° F. with no forced cooling.

Curve 34 shows that if the aforementioned 18 inch T8 lamp having an amalgam-cathode spacing of 20 mm. is operated at 2 amperes and 75 watts total (50 watts per foot) without any forced cooling, the output will increase to a value within 3 minutes that is over 2½ times the stabilized output of the conventional lamp and will then start to drop off. However, if forced cooling is provided by turning on an air blower, as indicated in FIG. 4, the light output will again increase slowly and finally stabilize at a value more than 140% higher than the output of the prior art lamp that is also force-cooled but operated at a loading of only 17 watts per foot.

The data on which the curves in FIG. 4 are based was obtained by operating the respective lamps at an ambient temperature of about 77° F. When forced cooling was used the end of the lamp containing the amalgam was maintained at a temperature of about 100° F., which temperature was measured at a point on the outer surface of the lamp bulb 12 near the base 24.

It will be appreciated from the foregoing that the objects of the invention have been achieved in that a compact highly-loaded fluorescent lamp has been provided which, by virtue of an amalgam whose composition and location are correlated with the fill gas composition and pressure, operates efficiently at much higher power loading than were heretofore possible.

While several embodiments have been described, it will be appreciated that various changes can be made without departing from the spirit and scope of the invention.

I claim as my invention:

1. A compact high-output fluorescent lamp adapted for operation at a selected power loading in excess of 10 watts per foot comprising, in combination:
   a sealed phosphor-coated vitreous envelope of circular cross-section having an outer diameter of between 0.75 inch and 1.25 inches and an overall length of between 1 foot and 2 feet,
   a vitreous stem sealed to one end of said envelope,
   a pair of spaced electrodes within said envelope, one of said electrodes being supported by said stem,
   an amalgam comprising indium and mercury disposed on said stem at a location such that said amalgam and the associated electrode are spaced from 20 mm. to 40 mm. apart, and
   a neon-argon fill gas within said envelope consisting essentially of a mixture of from 75% to 90% neon with argon at a total pressure of from 2.5 to 4.0 mm. of mercury,
   the spacing between said amalgam and the associated electrode being so related to the power loading that the spacing increases from its lower limit as the power loading increases, and
   the indium content of the amalgam and the fill gas composition and pressure being so related to the amalgam-electrode spacing that the lamp reaches peak light output when it is operated at said selected power loading.

2. The fluorescent lamp set forth in claim 1 wherein said amalgam is located on a holder that is fastened to a pre-selected portion of said stem.

3. The fluorescent lamp set forth in claim 1 wherein said amalgam consists of an indium-mercury alloy that contains from 80 atom percent to 95 atom percent indium.

4. The fluorescent lamp set forth in claim 3 wherein:
   said envelope has an outside diameter of approximately 1 inch and is approximately 18 inches long,
   each end of said envelope is hermetically sealed to a glass stem,
   a portion of said envelope is devoid of phosphor coating and provides an axially-extending slit aperture, said amalgam is disposed on a holder that is fastened to one of said stems, and said fill gas consists of a mixture of 80% neon and 20% argon at a total pressure of approximately 3 mm. of mercury.

5. The aperture fluorescent lamp set forth in claim 4 wherein:

said holder comprises a wire mesh collar that is located approximately 20 mm. from the electrode at that end of the envelope, said amalgam initially contains 170 mg. of indium and 70 mg. of mercury, and said lamp reaches peak light output at 800 ma. and a power loading of approximately 22 watts per foot when operated at an ambient temperature of about 77° F. without forced cooling.

6. The aperture fluorescent lamp set forth in claim 4 wherein:

said holder comprises a wire mesh collar that is located approximately 27 mm. from the electrode at that end of the lamp, said amalgam initially contains 170 mg. of indium and 70 mg. of mercury, and said lamp reaches a peak light output at 1.2 amperes and a loading of approximately 33 watts per foot when operated at an ambient temperature of about 77° F. without forced cooling.

References Cited

UNITED STATES PATENTS

| | | | |
|---|---|---|---|
| 2,687,486 | 8/1954 | Heine et al. | 313—109 |
| 3,275,872 | 9/1966 | Chernin et al. | 313—109 |
| 3,373,303 | 3/1968 | Evans | 313—178 X |

RAYMOND F. HOSSFELD, Primary Examiner

U.S. Cl. X.R.

313—174, 178